(12) United States Patent
Eismann et al.

(10) Patent No.: US 8,386,960 B1
(45) Date of Patent: Feb. 26, 2013

(54) BUILDING OBJECT INTERACTIONS

(75) Inventors: Ethan A. Eismann, Oakland, CA (US); Ty Voliter, San Jose, CA (US); Narciso Jaramillo, Piedmont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 614 days.

(21) Appl. No.: 12/201,339

(22) Filed: Aug. 29, 2008

(51) Int. Cl.
*G06F 9/45* (2006.01)
*G06F 9/44* (2006.01)

(52) U.S. Cl. .................. 715/835; 717/113; 717/109
(58) Field of Classification Search .................. 715/835
See application file for complete search history.

(56) References Cited

U.S. PATENT DOCUMENTS

| | | | |
|---|---|---|---|
| 5,557,730 A | 9/1996 | Frid-Nielsen | |
| 5,642,511 A | 6/1997 | Chow | |
| 5,742,848 A | 4/1998 | Burgess | |
| 5,760,788 A * | 6/1998 | Chainini et al. | 345/474 |
| 5,862,379 A | 1/1999 | Rubin | |
| 6,078,743 A | 6/2000 | Apte | |
| 6,430,556 B1 | 8/2002 | Goldberg | |
| 6,564,368 B1 | 5/2003 | Beckett | |
| 6,662,357 B1 | 12/2003 | Bowman-Amuah | |
| 6,701,513 B1 * | 3/2004 | Bailey | 717/109 |
| 6,823,495 B1 | 11/2004 | Vedula | |
| 7,159,185 B1 | 1/2007 | Vedula | |
| 7,240,328 B2 | 7/2007 | Beckett | |
| 2003/0037310 A1 * | 2/2003 | Ge | 717/113 |
| 2007/0192745 A1 * | 8/2007 | Fernandez et al. | 715/840 |
| 2007/0256052 A1 | 11/2007 | Xu | |
| 2007/0261027 A1 | 11/2007 | Dhanakshirur | |
| 2008/0015911 A1 | 1/2008 | Wang | |
| 2008/0016488 A1 | 1/2008 | Adams | |

OTHER PUBLICATIONS

Dana Nourie Getting Started With the NetBeans IDE Turorial May 22, 2005 updated Jul. 2008.*

* cited by examiner

*Primary Examiner* — Tuyetlien Tran
*Assistant Examiner* — Peiyong Weng
(74) *Attorney, Agent, or Firm* — Wolfe-SBMC

(57) ABSTRACT

A software development environment may have a object interaction construction interface for defining sentences that include two or more sentence atoms in an ordered arrangement. The sentence atoms may be one of: a source object, an event, a target object, and an action. The object interaction construction interface may receive user input selecting the sentence atoms in a particular sequence. The object interaction construction interface may configure a menu list of available second sentence atoms according to the type of sentence atom selected as the first sentence atom. Throughout the sequence, the object interaction construction interface will self-configure the next menu list according to the type of atom selected in the previous selection. When the sentence is complete, the software development environment may generate program instructions and/or data structures to implement object interactions defined by the sentence, which may be used to build an application.

39 Claims, 8 Drawing Sheets

US 8,386,960 B1

BUILDING OBJECT INTERACTIONS

BACKGROUND

Conventional solutions for building software applications typically require computer programming experience and training A programmer needs to know a programming language in order to write programming language code that creates the data structures and instructions that enable the various objects of the computer program to interact with one another.

Software applications frequently include object interactions, such as user interface object interactions. When one object receives information about a particular event, the object may perform a specific action on another object. For example, a shortcut object (e.g., "My Documents") may receive a mouse click event and interact with a file folder object by performing an open action on the file folder object. In response, the file folder object may open a window and display the contents of the "My Documents" folder. Other examples of objects that may interact include button objects, menu objects, image objects, audio objects, video objects, and text objects. There are many examples of objects that may interact.

SUMMARY

A software development environment may display an object interaction construction interface (e.g., dialog box) that includes an indication of a selected source object and two or more user interface elements that define interactions between the source object and one or more target objects. The interactions may be defined according to a defined syntax. The user interface elements include an event selection element, a target object selection element, and an action selection element.

The object interaction construction interface receives input via the event selection element that specifies a selected event. It also receives input via the target object selection element that specifies a selected target object, and receives input via the action selection element that specifies a selected action.

The object interaction construction interface displays a visual indication of the interactions according to the defined syntax. The visual display indicates that, in response to the selected event associated with the selected source object, the selected action will be performed relative to the selected target object.

Figure 1:
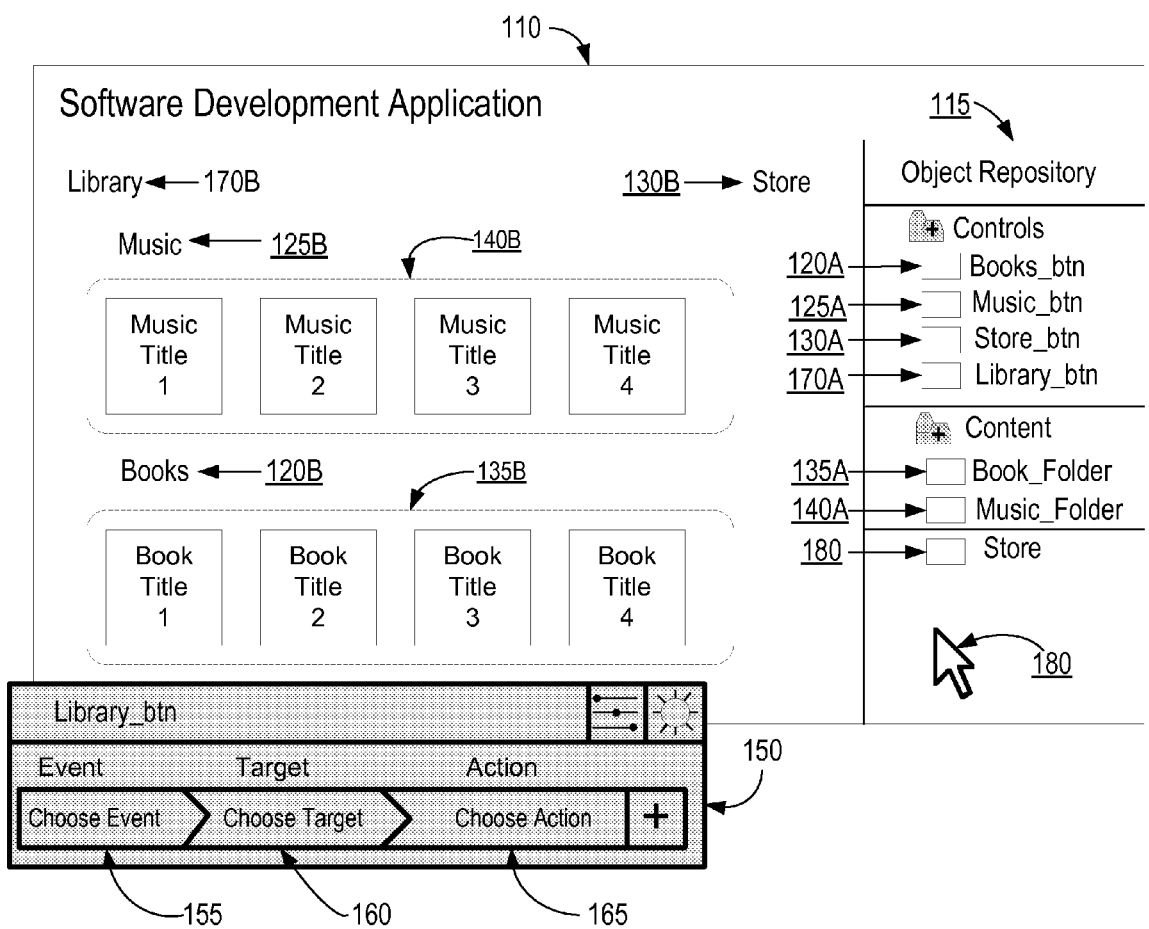
FIG. 1 is an illustration of a software development environment that includes a object interaction construction interface, according to some embodiments.

While the system is described herein by way of example for several embodiments and illustrative drawings, those skilled in the art will recognize that the system is not limited to the embodiments or drawings described. It should be understood, that the drawings and detailed description thereto are not intended to limit the system to the particular form disclosed but on the contrary, the intention is to cover all modifications, equivalents and alternatives falling within the spirit and scope of the present system as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words, "include", "including", and "includes" mean including, but not limiting to.

DETAILED DESCRIPTION OF EMBODIMENTS

In order to improve productivity and enable users to build complex applications without extensive training, a software development environment may be configured to receive input from a user in a graphical user interface (GUI) environment and generate programming instructions and data structures for various objects displayed on a user interface, without the user having to write code. In this way, a user without extensive training may be able to design certain aspects of an application program.

Various techniques for building object interactions are described herein, including identifying, defining, selecting and composing source objects, events, target objects and target actions. The term "interaction", as used herein, is an action that occurs as one object (i.e., referred to as a "source object") receives an event (i.e., referred to as a "source event") and has an effect on another object (i.e., referred to as a "target object"). As a result of the effect, the target object performs an action (i.e., referred to as a "target action").

The term, "object", as used herein, may refer to any media-based element, file, folder, document, asset, project, graphic image, artwork, digital photograph, group of pixels, sound file, music file, video file, folder, album, animation, network connection, computing device, computer program, email, button, control, text box, web page, Uniform Resource Identifier (URI), database, communication channel, and the like. In some cases, an object may comprise a collection of other objects of the same type or mixed types. For example, a folder object may contain many file objects.

The term "event" as used herein, may refer to a situation, condition, state change or a combination thereof. An application program, an object or a device may generate an event. For example, a mouse may generate an event when moved, or when a button on the mouse is pressed, held down or clicked. In another example, a clock may generate an event when it reaches a certain time (e.g., time defined state change event). In another example, a keyboard may generate an event when a certain key is pressed. An application program may generate an event when, for example, a document is loaded. In some embodiments, a user may define an event, such as when a security breach is detected. In some cases an event may be defined as a sequence of events, such as when two or more particular keys on a keyboard are pressed simultaneously.

The term "action" as used herein, may refer to something being done to an object. An action may be invoked, applied or performed on an object. An action implies some sort of engagement. Examples include, "open", "close", "move", and "play". In some embodiments, an action may be to change properties of a target object. For example, a target object's size or color may be changed.

The term, "sentence", as used herein, is a logical entity that defines how objects interact. A sentence may be made up of two or more "sentence atoms". A sentence atom may be defined as an indication of either an object (e.g., media object, file object, menu object, etc.), an event (e.g., on-click, on-open, on-mouse-over, and the like) or an action (e.g., open, close, play music, and the like).

An object interaction construction interface may be displayed on a user interface and may be configured to receive input from a user selecting various sentence atoms. The object interaction construction interface is a special window, or dialog box displayed on the user interface to receive input from the user for constructing sentences. The object interaction construction interface may be modeless, meaning the object interaction construction interface can be left open while work continues in other windows on the desktop.

The object interaction construction interface may be configured to define the syntax for how the sentence atoms interact. The object interaction construction interface may receive sentence atom selection information in a particular order according to the syntax. For example, indications of the sentence atoms may be selected in the following order: the source object, the source object event, the target object, and the target action. In various embodiments, the object interaction construction interface may allow more or fewer sentence atom selections. The ordered sequence of source object, source object event, target object, and target action is described herein as one possible embodiment. In various embodiments, other ordered sequences of sentence atoms may be utilized. For example, an alternate ordered sequence may be: source object, source object event, target object action, target object.

In some embodiments, the object interaction construction interface may "self-configure" as the user progresses through the sequence of steps required by the object interaction construction interface for constructing a sentence. For example, the user may select an indication of a first sentence atom of a particular type. Subsequently, the object interaction construction interface may determine a list of indications of possible sentence atoms for the second sentence atom in the sequence, based on the type of sentence atom selected for the first sentence atom. In other words, the list of possible choices for the second sentence atom may be based on the type of sentence atom that was selected as the first sentence atom. In this fashion, the object interaction construction interface may self-configure based on user input throughout the sequence of selecting all of the sentence atoms for the sentence.

In one example, the object interaction construction interface may receive input from a user selecting an image of an album cover as a source object (e.g., first sentence atom). Subsequent to receiving the indication of the image as the source object, the object interaction construction interface may determine a list of events associated with the image, such as "on-click", "on-double-click", "on-mouse-over", etc. The events appropriate for one object type (e.g., image) may not be appropriate for another object type. Subsequent to determining the events associated with the image, the object interaction construction interface may populate a menu with the list of events. The user may select an indication of the appropriate event atom from the list of events in the menu. In this example, the user may select "on-click". Subsequently, the object interaction construction interface may determine a list of target objects associated with the source event object previously selected. As the user continues to select atoms for the sentence, the object interaction construction interface may self-configure based on the previous selection(s) until all sentence atoms have been selected and the sentence is constructed. In this example, the user may select an indication of an audio clip. In response, the object interaction construction interface 150 may configure a selection of target actions that include, "edit", "play", and "volume control"; all of which may be configured based on the type of target object selected (e.g., audio clip). (See the description for FIG. 3 for a more detailed description of the self-configure feature of the object interaction construction interface.)

The object interaction construction interface may save the sentence as part of an application program that that can be run or executed at a later time. In the example described above, if the album image receives an "on-click" event, the specified audio clip will play.

FIG. 1 is an illustration of a software development environment 110 that includes object interaction construction interface 150, according to some embodiments. Software development environment 110 may be configured to design an application program that includes multiple objects. Object interaction construction interface 150 may be configured to define how the objects interact. Object interaction construction interface 150 may be displayed by software development application 110 in response to a menu selection. For example, software development application 110 may have a menu titled, "Build Sentence". When selected with a pointing device, keyboard or keypad, object interaction construction interface 150 may be displayed. In another example, object interaction construction interface 150 may be a separate application and may be started or initiated when a user clicks on a shortcut, clicks on an icon, or uses a keyboard or keypad to start the application.

In some embodiments, software development environment 110 may include an object repository 115 having objects 120A, 125A, 130A, 170A, 135A, 140A, and 180. In some cases, object repository 115 may include a list of objects used within software development application 110. Button elements 170B, 120B, 130B and 125B and folder elements 140B and 135B are displayed as example file folder objects within software development environment 110.

Element 180 represents a pointing device, used to select and/or manipulate objects, menus and provide input to software development environment 110 and object interaction construction interface 150. A keyboard, keypad or another suitable input device may also be used.

In one example of how software development application 110 may work in conjunction with object interaction construction interface 150 to build a sentence, a user may initially select a source object. A user may select library 170B as the source object atom by selecting one or more keys on a keyboard or manipulating a user input device (e.g., mouse) to select item 170B as the source object. Object interaction construction interface 150 may be configured to receive input from the user input device and determine which pixels on the display device have been selected. For example, if element 170B were an image, a user may put a pointing device above and to the left of "Library" (e.g., element 170B), press a mouse key and drag the pointing device down and to the right and then release the mouse button, thus selecting a particular set of pixels as the source object. Object interaction construction interface 150 may determine which pixels on the display device were selected and designate those pixels as the source object atom. In another example, if "Library" (e.g., element 170B) is a control (e.g., button), object interaction construction interface 150 may receive a mouse click event over the control, thus indicating the button as the source object atom. If library 170B were an icon, object interaction construction interface 150 may receive a mouse click event with the pointing device over the icon, indicating selection of a source object atom. Any of the methods described above or another suitable method for selecting pixels, controls, or other displayed objects may be used to select an object as the source object atom.

Object interaction construction interface 150 may receive the selection input and in this example, "Library" may be highlighted when selected. In the example case where Library 170B is a control (e.g., button), object interaction construction interface 150 may display "Library_btn" in the title bar indicating the library button has been selected as the "source object". Subsequent to receiving user input selecting library button 170B, object interaction construction interface 150 may receive input from the user selecting the "choose event" button 155 and determine a list of events associated with library button 170 based on the library button 170B object type (e.g., button). The events may be displayed in an event selection element (e.g., a menu list) for selection. (See FIG. 4C for an example event menu list.) Example events include "on-click", "on-double-click" and "on-mouse-down". Object interaction construction interface 150 may receive input from the user selecting an event item from the event selection element. In this example, the event selected by the user is "on-click".

Subsequent to receiving the selection of the "on-click" event, object interaction construction interface 150 may receive input from the user selecting the "choose target" 160 menu selection and determine a list of "target objects" based on the previously selected "source object event". In some embodiments, object interaction construction interface 150 may populate a target object selection element (e.g., a drop-down menu) with the list of "target objects". (See FIG. 5B for an example of the target object menu list.) In this example, the user may choose item 160, "choose target" to view the menu list. In response, object interaction construction interface 150 may display the list of targets in a target object selection element. The user may select "music folder" from the list.

In some embodiments, rather than displaying a menu list of possible targets, object interaction construction interface 150 may display an icon with the text, "Drag icon to select target". The user may manipulate a pointing device and drag the icon to the target object and release the pointing device over the target object. For example, the icon may be dragged to a "music folder" and dropped, thus selecting the music folder as the target object. (Dragging an icon, and dropping the icon on an object may also be used as a method to select a source object.)

Subsequent to receiving the selection of the "music folder" target, object interaction construction interface 150 may receive input from the user selecting the "choose action" menu item 165 and determine a list of actions based on the selected target object type. Subsequently, object interaction construction interface 150 may receive input from the user selecting the "open" action from the action selection element (e.g., action menu). Object interaction construction interface may then save the sentence with an indication of sentence atom interactions. The sentence may be saved in the form of data structures and/or code.

In this example application information including the sentence defining object interactions, may be generated by software development environment 110. During execution, when the application receives an on-click event for the library button, the music folder may open, displaying the contents.

In various embodiments, software development environment 110 may include other modules and/or other windows not displayed in FIG. 1. Component repository 115 may be displayed in a window separate from software development environment 110 or not displayed at all.

As described above, the object interaction construction interface 150 may be a component of a software development environment 110. Object interaction construction interface 150 may be displayed as a defined subregion within software development application 110. Other portions of software development application 110 may remain active while a user is interacting with object interaction construction interface 150. For example, in the preferred embodiment, objection interaction construction interface 150 is displayed modeless, in that it can be left open while work continues in another area of the GUI, such as in software development environment 110. However, in some embodiments object interaction construction interface 150 may be displayed in a modal fashion. In some embodiments, object interaction construction interface 150 may receive user input and configure a transparency level, such that the underlying portion of software development application 110 is visible through object interaction construction interface 150.

In various embodiments, object interaction construction interface 150 may display text, images, menu selections and receive input from a user. In some cases, object interaction construction interface 150 may impose a workflow, such that information can only be received from the user in a particular sequence or order. Object interaction construction interface 150 may be displayed floating on the user interface and may be configured to display anywhere within the display area. In some embodiments, object interaction construction interface 150 may be displayed as opaque, such that objects located under object interaction construction interface 150 may be seen through the box. In some cases, object interaction construction interface 150 may be displayed attached to software development environment 110, such that one edge of object interaction construction interface 150 may abut, adjoin or share a common boundary with software development environment 110.

In some embodiments, object interaction construction interface 150 and the techniques described herein may be implemented in a procedural programming language such as C or Visual Basic. In other embodiments, the techniques described herein may be implemented in an object oriented programming language such as C++, Java™, or C#™. In other embodiments, the techniques described herein may be implemented in a scripting language, or implemented within a runtime environment, such as Adobe Flash™. The techniques described herein may be implemented utilizing a framework, such as .NET or J2EE and/or technologies such as XML, HTML, XHTML, HTTP, Ajax, Ruby, PHP, Perl and/or JavaScript.

Object interaction construction interface 150 may be implemented as a stand-alone application program, a plug-in, a module or one or more components of a software development environment 110. Object interaction construction interface 150 may run on a single computer system or be implemented as part of a client-server system. In some cases object interaction construction interface 150 may be implemented as a web-based system. For example, in one implementation software development environment 110 and object interaction construction interface 150 may execute within a web browser. Other implementations have been contemplated.

Figure 2:
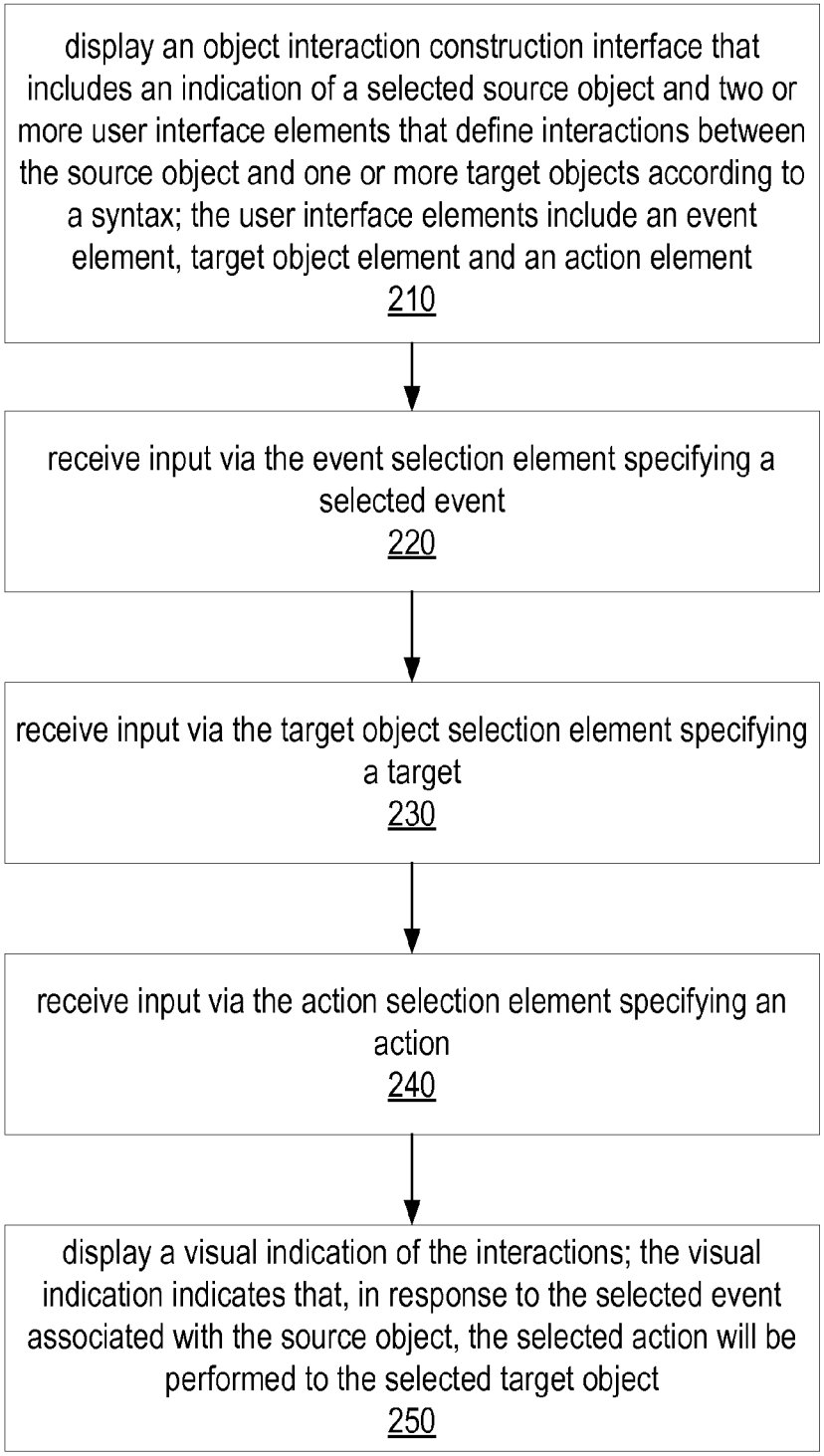
FIG. 2 is a flow diagram illustrating a method for building object interactions, according to some embodiments.

FIG. 2 is a flow diagram illustrating a method for building object interactions, according to some embodiments. As shown in block 210, an object interaction construction interface 150 may be displayed (e.g., by software development application 110). The object interaction construction interface 150 may include an indication of a selected source object. For example, object interaction construction interface 150 may receive input from a user selecting the source object. Object interaction construction interface 150 may further receive input indicating a selection of two or more user interface elements that define interactions between the source object and one or more target objects according to a defined syntax. The user interface elements may include an event element (e.g., selected by item 155 in FIG. 1), a target object element (e.g., selected by element 160 in FIG. 1) and an action element (e.g., selected by item 165 in FIG. 1).

As shown in block 220, object interaction construction interface 150 may receive input via the event selection element specifying a selected event. (E.g., see FIG. 4C.) As shown in block 230, object interaction construction interface 150 may receive input via the target object selection element specifying a target. (E.g., see FIG. 5A.) As shown in block 240, object interaction construction interface 150 may receive input via the action selection element specifying an action. (E.g., see FIG. 5B.)

As shown in block 250, object interaction construction interface 150 may display a visual indication of the interactions. The visual indication of the interaction shows that in response to the selected event associated with the source object, the selected action will be performed on the selected target action. (E.g., see FIG. 5B.)

Object interaction construction interface 150 may define the syntax, which is the ordered sequence of sentence atoms within the sentence. In one example, object interaction construction interface 150 may require the following arrangement or syntax of atoms within the sentence: (1) a source object, (2) a source object event, (3) a target object, and (4) a target object action. In another embodiment, object interaction construction interface 150 may require the following syntax: (1) a source object, (2) a source object event, (3) a target object action, and (4) a target object. (In various embodiments, other arrangements of sentence atoms may be utilized.)

Object interaction construction interface 150 may receive input from the user selecting an indication of the sentence atoms in the order required by the syntax. In other words, the object interaction construction interface may require the selection of indications of sentence atoms be received in a specified sequence. For example, a user may select a menu item and/or use a pointing device 180 to select a source object. The source object may be the first atom in the sequence. Subsequently, the user may progress through the selection of sentence atoms by selecting item 155, "Choose Event", then item 160, "Choose Target", then item 165, "Choose Action". Each atom may have an associated menu of possible atoms to select from. (See FIG. 4C, FIG., 5A and FIG. 5B.) Once all sentence atoms have been selected, the user interface (e.g., software development application 110 or object interaction construction interface 150) may display a visual indication of the interactions. Further, software development application 110 or object interaction construction interface 150 may generate program instructions executable to implement the one or more interactions defined via the object interaction construction interface.

In some embodiments, object interaction construction interface 150 may allow multiple targets and multiple target actions to be associated with one source object. For example, if a user clicks a mouse pointer on an audio clip, the audio clip may play the audio and the user interface may transition to an online store. In this example, two actions are performed (e.g., playing the audio file and transitioning to the online store) after the single event (e.g., mouse click on the audio file). Further, in some embodiments, a timeline or time delay may be associated with certain actions. (See the description for FIG. 6 for more information on time lines.)

In some embodiments, one source object may be associated with two or more sentences. For example, an audio clip (e.g., source object) may have one sentence for the "on-click" event, which would play an audio. The same audio clip source object may also be associated with a second sentence for an "on-mouse-over" event, which would display the audio's artist and title.

Figure 3:
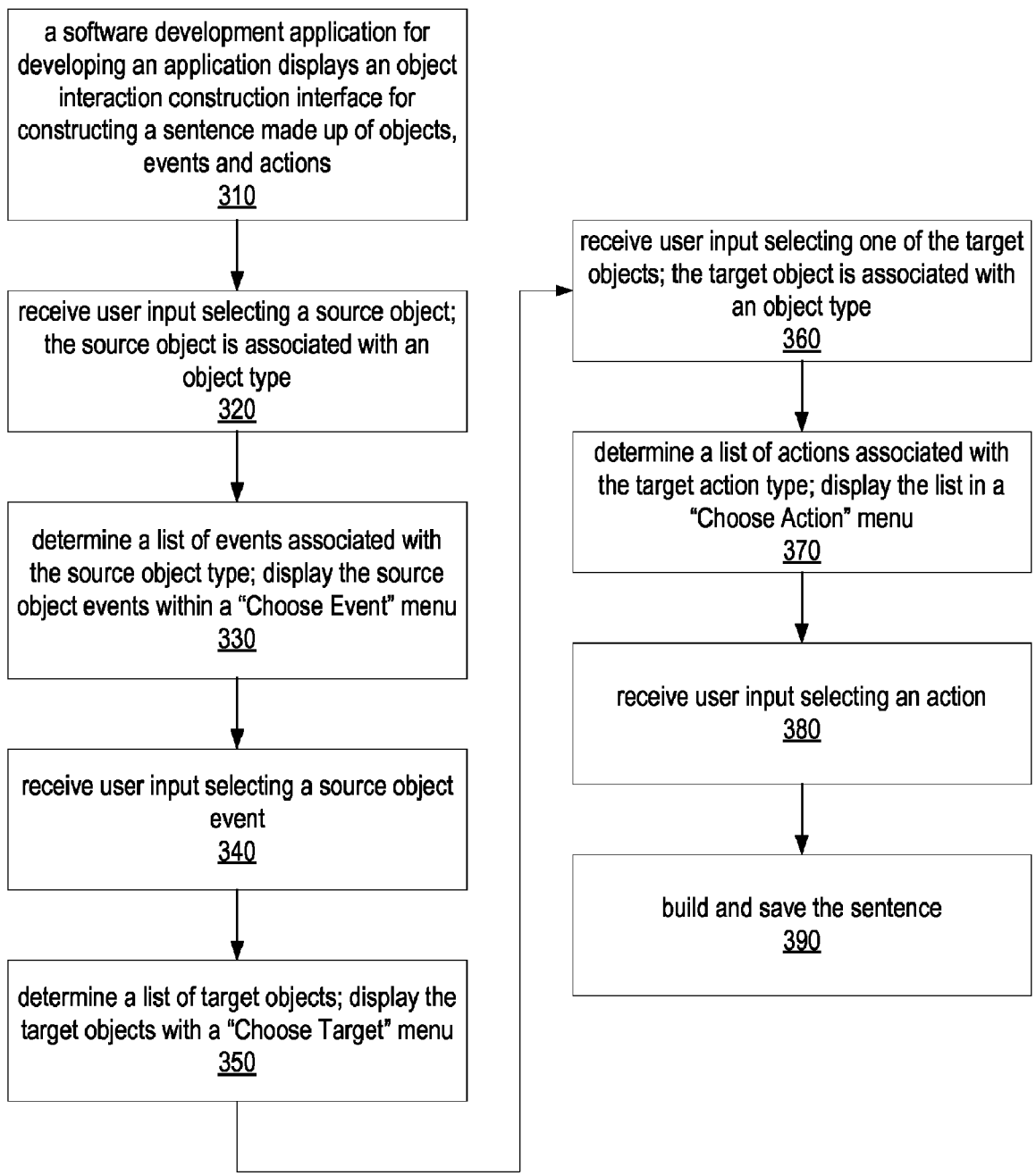
FIG. 3 is a flow diagram illustrating the operation of the object interaction construction interface, according to some embodiments.

FIG. 3 is a flow diagram illustrating an object interaction construction interface customizing a display of sentence atoms, according to some embodiments. As shown in block 310, a software development environment 110 for developing an application may display a object interaction construction interface 150 for constructing a sentence made up of objects, events and actions.

Object interaction construction interface 150 may receive user input selecting a source object; the source object may be associated with a particular object type. For example, the source object may be a particular menu and thus may be associated with a menu type. In another example, the source object may be a file folder and thus associated with a file folder type. In another example, the source object may be artwork and the artwork may be associated with a certain group of pixels displayed on the user interface.

As shown in block 330, object interaction construction interface 150 may determine a list of events associated with the source object type and display the source object events with a "Choose Event" menu. (See FIG. 4C.) The menu may be customized, or filtered depending on the selected source object type. In this way, as each sentence atom is selected in a particular sequence, the menu lists of the remaining sentence atoms are customized, or filtered according to the prior selections received from the user. For example, when first sentence atom is selected (e.g., source object), object interaction construction interface 150 will determine the type of the first atom and customize the menu list of available second sentence atoms according to the type of the first sentence atom. After the second sentence atom is selected, object interaction construction interface 150 will determine the list of available sentence atoms for the third sentence atom depending on the selected type of the second sentence atom, and so forth until the sentence is complete.

As shown in block 340, object interaction construction interface 150 may receive user input selecting the source event. In some embodiments, when an event is selected, another menu option may be displayed (not shown in the figures) to receive input regarding a condition. For example, the selected event for a button source object may be "double-click". An associated condition may be, "control key down". In this example, combination of double-click with the control key pressed make up the event.

Subsequent to receiving the event selection, as shown in block 350, object interaction construction interface 150 may determine a list of target objects and display the list of target objects in a menu selection. (See FIG. 5A.) Object interaction construction interface 150 may then receive user input selecting one of the target objects, as shown in block 360. The selected target object may be associated with a particular type. Subsequently, object interaction construction interface 150 may determine a list of actions associated with the target action type and display the list in a "Choose Action" menu as shown in block 370. (See FIG. 5B.) As shown in block 380, object interaction construction interface 150 may receive user input selecting an action.

Subsequently, object interaction construction interface 150 may build the sentence of the selected sentence atoms and save the sentence to storage for later use, as shown in block 390. As described above, the saved sentence may be in the form of code, program instructions or as a data structure (e.g., XML), or as a combination of code and data structures.

In some embodiments, object interaction construction interface 150 may be configured to receive the selection of a second set of sentence atoms for a selected source object. In this way, a second event selection, second target object selection and a second action selection may be made. For example, when a user double-clicks an audio clip, the first sentence associated with the audio clip (e.g., the source object) may play the audio clip. A second sentence associated with the audio clip may transition to a shopping web page so that the user may select the song associated with the audio clip for purchase. (See element 610 in FIG. 6 for an example of a first sentence and a second sentence associated with a source object.)

Figure 4A:
FIG. 4A is a block diagram illustrating a object interaction construction interface prior to the selection of sentence atoms, according to some embodiments.

FIG. 4A is a block diagram illustrating a object interaction construction interface prior to the selection of sentence atoms, according to some embodiments. In some cases, object interaction construction interface 150 may display the text, "No Selection", as shown in FIG. 4A, indicating a source object has not yet been selected.

Figure 4B:
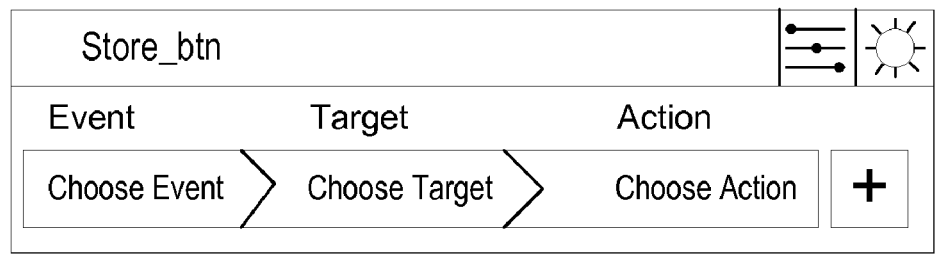
FIG. 4B is a block diagram illustrating a object interaction construction interface after the selection of a "Store" button as a source object, according to some embodiments.

In order to select a source object, object interaction construction interface 150 or development application 110 may receive input from a user, such as receiving a double-click from an input device (e.g., mouse) over a displayed object. For example, referring now to FIG. 1, a user may double-click the "Store" button 130B with input device 180. In another example, artwork may be selected by any one of several different methods. Examples include dragging a user input device (e.g., mouse) over the artwork, or clicking on the artwork, or selecting the artwork via a menu selection. (Any other suitable method may be used for selecting objects on a user interface, including receiving keyboard input.) Subsequently, as shown in FIG. 4B, object interaction construction interface 150 may display text identifying the source object in the title bar. Note that the title bar for FIG. 4B displays, "Store_btn".

Figure 4C:
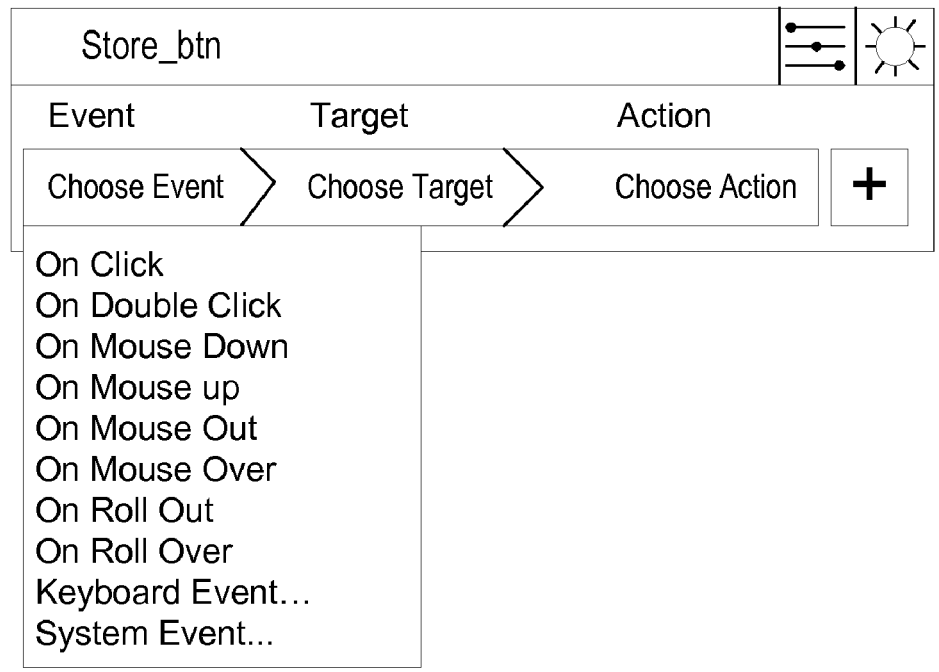
FIG. 4C is a block diagram illustrating a "Choose Event" menu selection, according to some embodiments.

FIG. 4C is a block diagram illustrating a "Choose Event" menu selection, according to some embodiments. As described above, the menu list for "Choose Event" may be determined according to the type of source object that was previously selected. The list of possible events may be displayed as shown in block 4C. In some cases the menu list may have a selection for "Keyboard Event". If selected, the user may define a custom key or combination of keys as the source object event. In another case, the user may select, "System Event." In this case, the user may define a particular system event, such as, "Application Shutdown", or "Application Startup".

Figure 5A:
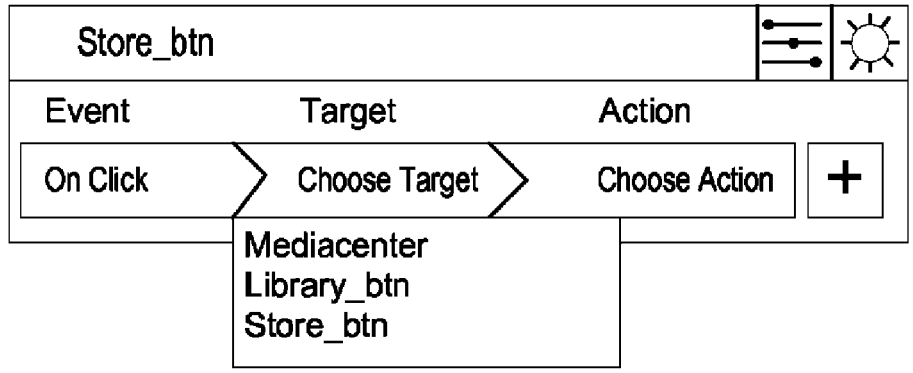
FIG. 5A is a block diagram illustrating a "Choose Target" menu selection, according to some embodiments.

FIG. 5A is a block diagram illustrating a "Choose Target" menu selection, according to some embodiments. The target object may be the object that receives an action. As described above, the list of menu items for "Choose Target" may be determined based on the event selected in the previous step. The list may be displayed as shown in 5A and object interaction construction interface 150 may receive user input selecting one of the displayed targets.

Figure 5B:
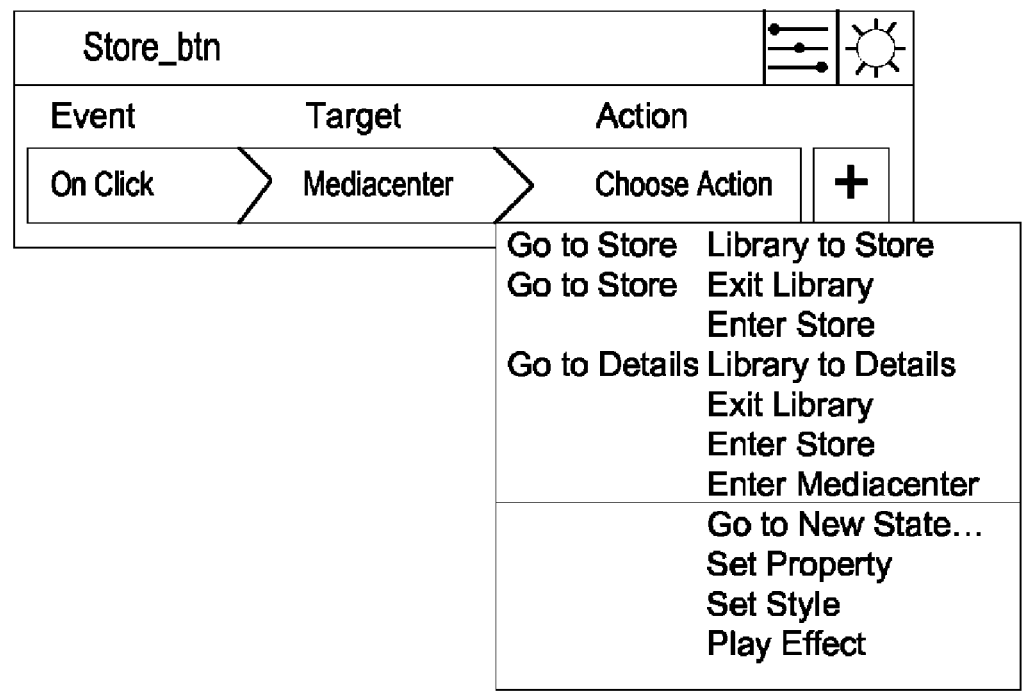
FIG. 5B is a block diagram illustrating a "Choose Action" menu selection, according to some embodiments.

FIG. 5B is a block diagram illustrating a "Choose Action" menu selection, according to some embodiments. The list of target actions may be determined according to the previously selected target object. In some embodiments, additional information may be required when selecting an action and/or a target. For example, if the "Set Property" menu item is selected for an action, an in-place popup window (not shown in the figures) may be displayed over the action/target pair indicating the property setting is related to both the action and the target. The popup window may display a list of properties that may be changed for the target. In one example, the selected target may be a button and the property popup may receive input setting the size of the button, or the color of the button, or some other button property. A popup may be displayed for any additional information related to source objects, events, target objects or actions. Further, information may be received other than property information, such as style information, or "Setting" information (e.g., setting the volume for playing a music file.) The popup window may be displayed adjacent to, over, or partially over one or more of the user interface elements (e.g. 155, 160, 165) to which it pertains. If the popup window is displayed over or partially over one or more user interface elements, the popup window may be transparent so that the underlying user interface element(s) are still discernible. For instance, in the above example, a set-property popup window may be displayed at least partially over both the target element 160 specifying a button and the action element 165 specifying a press action, where the set-property window allows the appearance of the specified button to be set for when the specified action occurs. For example, a property in the popup window may be set to "red" to indicate that the specified button should turn red when pressed or clicked.

In some embodiments, the target actions may include more than one action or multiple actions. For example, as shown in block 5B, the "Go to Store" action may be associated with "Library to Store", which may represent a transition from a Library page display to a Store page display. Another "Go to Store" item may be associated with one action (e.g., "Library to Store") or two actions. In this case, "Exit Library" may be the first action and "Enter Store" may be the second action. The "Go to Details" item is associated with seven different actions, which may be executed sequentially. In some embodiments, object interaction construction interface 150 may be configured to receive user input and define the sequence of actions associated with a single menu selection as shown in FIG. 5B. In some embodiments, object interaction construction interface 150 may be configured to receive user input for user-defined actions. For example, object interaction construction interface 150 may receive input from a user defining an action of "change color", such that when a particular event occurs, a target object may perform the action of changing its color. In similar examples, object interaction construction interface may receive user-defined actions such as an object's property change, style change, animation change, or another suitable action.

In some cases, a target action may be defined as a state change or the animation of a target object, or both. For example, an e-commerce application may include a virtual shopping cart. The cart may be represented in different states, such as an empty cart, a one-item cart, or another state. When an item is placed in the cart, the item may be visually moved into the cart by animation.

Figure 6:
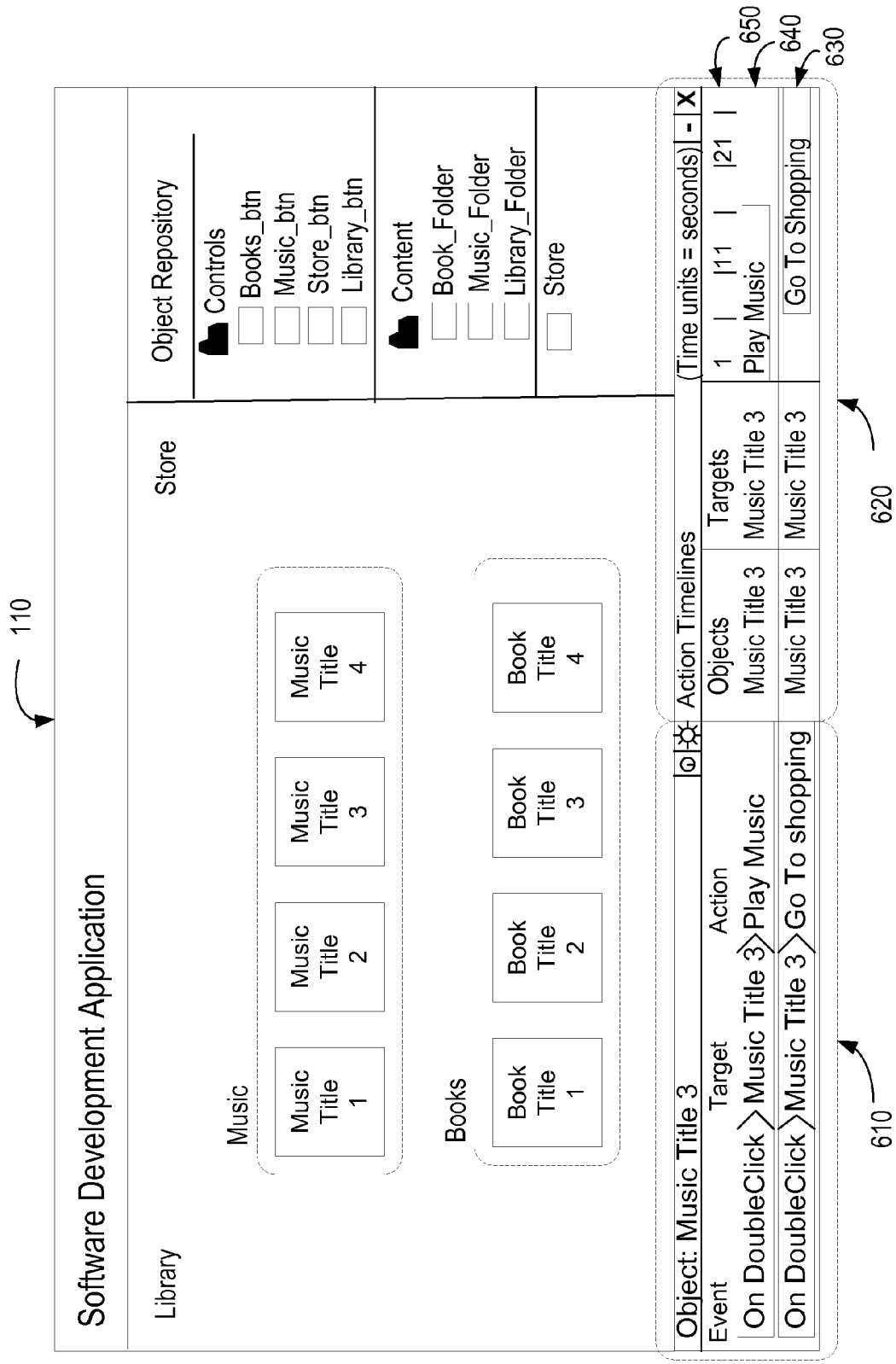
FIG. 6 is a block diagram illustrating a object interaction construction interface with an action timeline, according to some embodiments.

FIG. 6 is a block diagram illustrating an object interaction construction interface with an action timeline, according to some embodiments. FIG. 6 illustrates an object interaction construction interface 610 that includes a timeline interface as shown at item 620. A timeline (e.g., items 640 and 630) may be presented to configure one or more actions associated with one or more sentences.

Software development application 110 and/or object interaction construction interface 150 may display the timeline interface as shown in FIG. 6 in response to a user selecting a "Configure Timeline" menu selection, or a similar menu selection. In response, the user interface shown in elements 610 and 620 may be displayed. The user interface may receive input from a user selecting a sentence to apply a timeline to. Timeline interface 620 may be configured to receive user input associating one or more target actions (e.g., elements 640 and 630) with a timeline (e.g., element 650).

As shown at item 650, the timeline may be configured with an index. In this example, the index includes time units in seconds. Other time units may be utilized in other embodiments, such as minutes or hours or any other suitable index. In various embodiments, the index may be changed to different units. The timeline interface may determine a time span between the time an event occurs to a source object and an action occurs to a target object. Further, in some cases the timeline interface may determine the duration of an action (e.g., play an audio clip for 30 seconds). The duration of the action may be shortened or lengthened.

In some embodiments, a source object and a target object may be the same object. In one example, as shown at element 610, when Music Title 3 (e.g., source object) receives a double-click event (e.g., source object event) the action, "Play Music" may be executed. In this case, the source object and the target object are the same (e.g., Music Title 3). Note that the "Play Music" event is executed at time unit 0, as shown at element 640. A second action, "Go to Shopping" may also be associated with the double-click-event as shown at item 630. The "Go to Shopping" target action may be executed 10 seconds after the double-click event. Notice the "Go to Shopping" block at 630 begins at index 10 relative to item 650. In this example, subsequent to Music Title 3 receiving a double-click event, the Music Title 3 will play immediately (e.g., time index 0) and 10 seconds later, a web browser application will transition to a shopping page, as shown at item 630.

In various embodiments, actions associated with timelines may include changing a control or an area of the display from hidden to visible or visible to hidden, loading data, exiting the display of a web page, displaying a new web page, changing the color of an area of the display device, enabling a control, disabling a control, starting a program, sliding artwork across the display device or playing an audio clip or video. Any action can be associated with a timeline.

In some embodiments, the timeline interface (shown at item 620 in FIG. 6) may receive input adding a new action associated with a selected event. In response, object interaction construction interface 150 may construct and display a new sentence for the selected event in area 610. In a similar fashion, object interaction construction interface 150 (shown at item 610 in FIG. 6) may allow a user to add a new sentence with a new action. For example, in FIG. 6 note there are two sentences (e.g., elements 640 and 650) for the source object "Music Title 3" and event "On DoubleClick". A corresponding timeline is automatically created in area 620.

In the operations described above, the timeline interface 620 may be used to add a new action for an existing event, resulting in the creation of a new sentence in area 610, or a new sentence may be added at 610 creating a new time line entry in 620. In other words, there may be an equivalence between sentences in 610 and timeline entries in 620. An addition or modification in 610 is automatically reflected in 620, and vice versa. Associated timeline information (e.g., delays and/or durations) may be configured for each of the sentences. The timeline interface may provides a visual representation of how actions for multiple sentences associated with an event are arranged in time.

In some cases items 610 and 620 may abut or share a common border with software development environment 110. In other cases they may float as a single dialog box or as separate dialog boxes. Other columns, menus, headings or controls may be shown in the timeline interface. The interface may be built to associate a timeline with different atoms (e.g., other than the target object action) or a different number of atoms.

Figure 7:
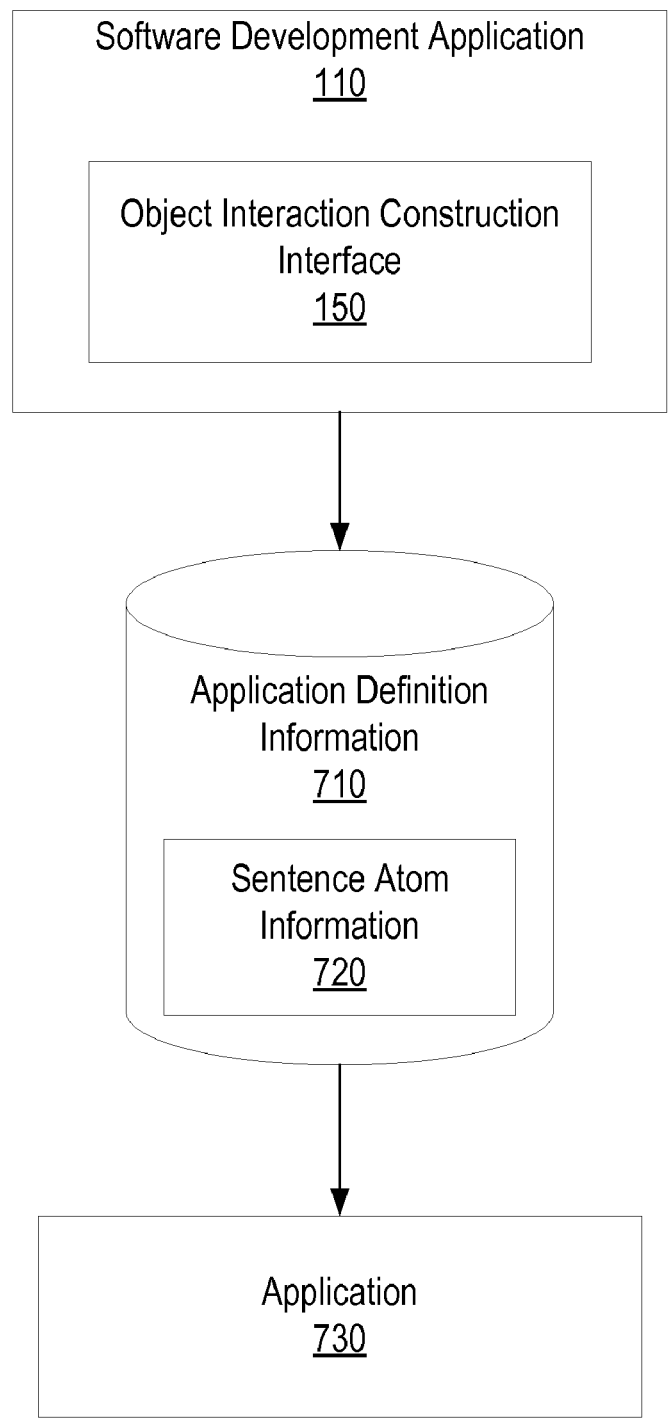
FIG. 7 is a block diagram illustrating a system for building an application, according to some embodiments.

FIG. 7 is a block diagram illustrating a system for building an application, according to some embodiments. As shown at block 110, a software development environment may provide a graphical user interface environment configured to build an application 730. As described above, the software development environment 110 may receive user input and place various objects within a window (e.g., shown in FIG. 1 and FIG. 6) in order to configure a new application 730. The software development environment 110 may include object interaction construction interface 150, configured to define sentence atom information 720 according to input received from a user. The sentence atom information 720 defines how the objects (e.g., defined within the application definition information 710) interact with one another. In various embodiments, sentence atom information 720 may be defined as data structures, programming instructions or a combination thereof. Sentence atom information 720 may be separate from application definition information 710, as shown in FIG. 7, or may be part of application definition information 710.

Application definition information 710 may be used to construct application 730. In some embodiments, a run-time environment (e.g., not shown in the figures) may read application definition information 710 and sentence atom information 720 in order to build application 730. In other embodiments, application definition information 710 and sentence atom information 720 may be read by a compiler and compiled into byte-code or into an executable application program (e.g., application program 730).

Figure 8:
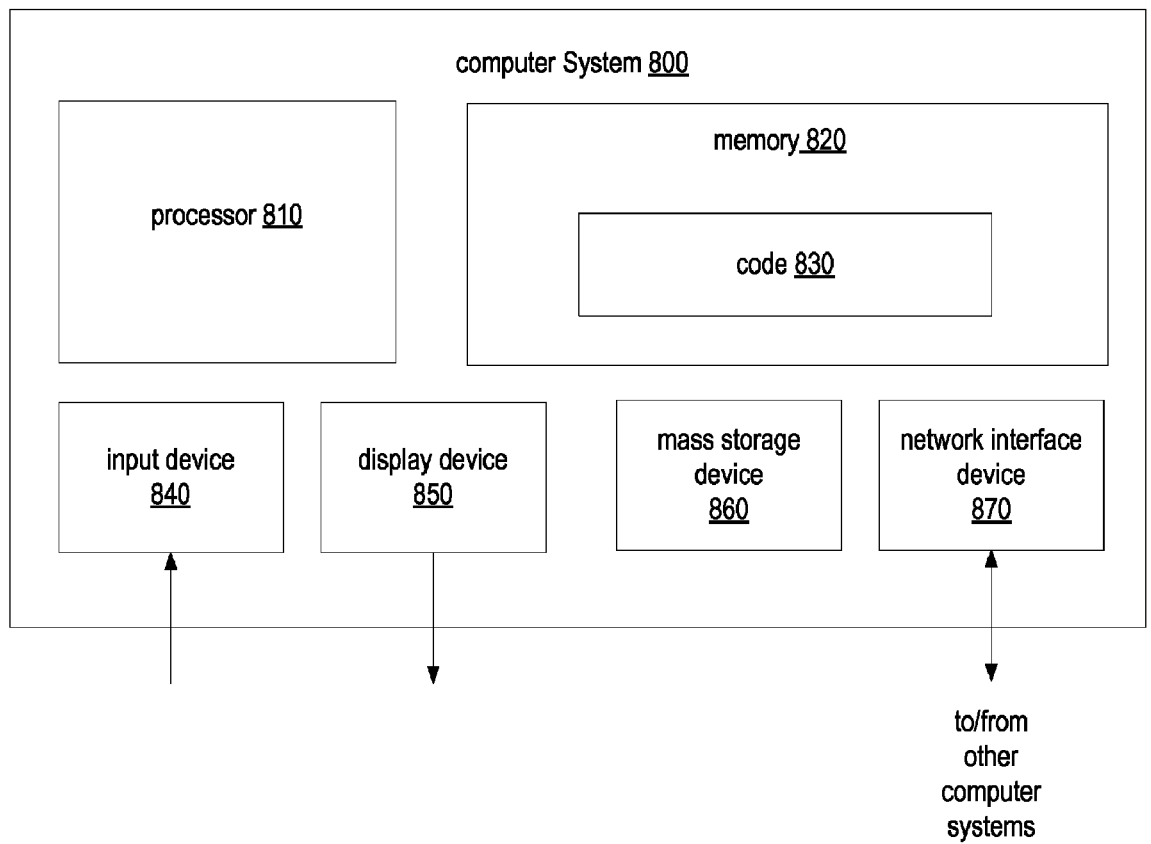
FIG. 8 is a block diagram illustrating a computing device, according to some embodiments.

FIG. 8 is a block diagram illustrating a computing device, according to an embodiment. Various components of embodiments of the client systems, databases, storage devices, clients and nodes, etc., as described herein, may be executed on one or more computer systems, which may interact with various other devices. One such computer system is illustrated by FIG. 8. In the illustrated embodiment, computer system 800 includes one or more processors 810 coupled to a system memory 820. Computer system 800 further includes a network interface 870 and one or more input/output devices 840/850, such as a cursor control device, keyboard, audio device and display device 850. In some embodiments, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments, processors 810 may be general-purpose or embedded processors implementing any of a variety of instruction set architectures (ISAs), such as the x86, PowerPC™, Scalable Processor Architecture (SPARC™), or Million Instructions per Second (MIPS™) Instruction Set Architectures (ISAs), or any other suitable ISA. In multiprocessor systems, each of processors 810 may commonly, but not necessarily, implement the same ISA.

System memory 820 is one example of a computer accessible medium that may be configured to store program instructions 830 and/or data accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. Program instructions and/or data may also be stored, for example, on a hard disk. In the illustrated embodiment, program instructions and data implementing desired functions, such as those described above for software development environment 110 and object interaction construction interface 150, as well as any of the methods shown in FIGS. 1-7, are shown stored within system memory 820 as program instructions 830 and data storage 860, respectively. In other embodiments, program instructions and/or data may be stored upon different types of computer-accessible media or on similar media separate from system memory 820 or computer system 800. Generally speaking, a computer-accessible medium may include storage media or memory media such as magnetic or optical media, e.g., disk or DVD/CD-ROM, volatile or non-volatile media such as RAM (e.g. Synchronous Dynamic RAM (SDRAM), Double Data Rate RAM (DDR RAM), RAMBUS Dynamic RAM (RDRAM), Static RAM (SRAM), etc.), Read Only Memory (ROM). Program instructions and data stored via a computer-accessible medium may be transmitted by transmission media or signals such as electrical, electromagnetic, or digital signals, which may be provided via a communication medium such as a network and/or a wireless link, such as may be implemented via network interface 870.

Network interface 870 may be configured to allow data to be exchanged between computer system 800 and other devices attached to a network, such as other computer systems, or between nodes of computer system 800. In various embodiments, network interface 870 may support communication via wired or wireless general data networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network and/or protocol.

Input/output devices 840 and 850 respectively, may in some embodiments include one or more display terminals, keyboards, keypads, touchpads, scanning devices, voice or optical recognition devices, or any other devices suitable for entering or retrieving data by one or more computer system 800. Multiple input/output devices 840 and 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 870.

Memory 820 may include program instructions 830, configured to implement at least a portion of embodiments of object interaction construction interface 150 and software development environment 110 as described herein; and data storage 860, comprising various documents, tables, databases, etc. accessible by program instructions 830. In one embodiment, program instructions 830 may include software elements of the object interaction construction interface 150 and software development environment 110 illustrated in the figures, and data storage 860 may include data used in embodiments of software development environment 110 and object interaction construction interface 150. In other embodiments, different software elements and data may be included. Program instructions and/or data may be stored, for example, on various types of memory including hard disks.

Those skilled in the art will appreciate that computer system 800 is merely illustrative and is not intended to limit the scope of the system as described herein. In particular, the computer system and devices may include any combination of hardware or software that can perform the indicated functions, including computers, network devices, internet appliances, PDAs, mobile phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, provided via a communication medium such as a network and/or a wireless link. Various embodiments may further include receiving, sending or storing instructions and/or data implemented in accordance with the foregoing description. Accordingly, the present system may be practiced with other computer system configurations.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc. Additionally, it is intended that any inconsistency in description between this document and any document incorporated within this document be resolved in favor of this document.

Various modifications and changes may be made as would be obvious to a person skilled in the art having the benefit of this disclosure. It is intended that the system embrace all such modifications and changes and, accordingly, the above description to be regarded in an illustrative rather than a restrictive sense.

What is claimed is:

1. A computer-implemented method, comprising:
 displaying an object interaction construction interface comprising a plurality of user interface elements usable to define one or more interactions between a selected source object and one or more target objects according to a defined syntax,
  wherein the plurality of user interface elements comprise an event selection element, a target object selection element, and an action selection element,
  wherein the event selection element is displayed including a visual indicator that an event selection needs to be made,
  wherein the target object selection element is displayed including a visual indicator that a target object selection needs to be made,
  wherein the action selection element is displayed including a visual indicator that an action selection needs to be made, and
  wherein each of the plurality of user interface elements is displayed together within the object interaction construction interface in a pre-defined order determined by the defined syntax;
 receiving input via the event selection element specifying a selected event;
 in response to said receiving input specifying the selected event, replacing the display of the visual indicator that the event selection needs to be made with a display of a visual indicator of the selected event;
 receiving input via the target object selection element specifying a selected target object;
 in response to said receiving input specifying the selected target object, replacing the display of the visual indicator that the target object selection needs to be made with a display of a visual indicator of the selected target object;
 receiving input via the action selection element specifying a selected action; and
 in response to said receiving input specifying the selected action, replacing the display of the visual indicator that the action selection needs to be made with a display of a visual indicator of the selected action;
 wherein each visual indication of the one or more interactions defined via the object interaction construction interface is displayed according to the defined syntax and indicates that, in response to the selected event associated with the selected source object, the selected action will be performed relative to the selected target object, and
 wherein the visual indication of the selected event, the selected target object, and the selected action are displayed together within the object interaction construction interface in the pre-defined order determined by the defined syntax.

2. The computer-implemented method as recited in claim 1, wherein the object interaction construction interface is part of a software development application, the computer-implemented method further comprising generating program instructions executable to implement the one or more interactions defined via the object interaction construction interface.

3. The computer-implemented method as recited in claim 1, wherein the object interaction construction interface is part of a software development application, wherein the object interaction construction interface is displayed as a defined subregion within a user interface for the software development application, wherein other portions of the user interface for the software development application remain active while a user is interacting with the object interaction construction interface.

4. The computer-implemented method as recited in claim 3, further comprising providing a user-configurable transparency level for the defined subregion for the object interaction construction interface, wherein an underlying portion of the user interface for the software development application is visible through the defined subregion dependent upon the transparency level.

5. The computer-implemented method as recited in claim 1, further comprising:
 repeating said displaying an object interaction construction interface, wherein for each repeated displaying, the plurality of user interface elements is displayed together within the object interaction construction interface according to the pre-defined order.

6. The computer-implemented method as recited in claim 1, further comprising:
 displaying a selection list comprising plurality of different event choices for the event selection element, wherein said receiving input via the event selection element comprises receiving a selection indication of one of the plurality of different event choices; and
 in response to receiving the input specifying the selected event, displaying in the object construction interface a visual indication of the selected event, wherein said displaying of the visual indication of the selected event replaces a display of the selection list.

7. The computer-implemented method as recited in claim 6, further comprising, prior to displaying the selection list, filtering the event choices dependent upon one or more of the selected source object, the selected target object, and the selected action.

8. The computer-implemented method as recited in claim 1, further comprising displaying a selection list comprising plurality of different target object choices for the target object selection element, wherein said receiving input via the target object selection element comprises receiving a selection indication of one of the plurality of different target object choices.

9. The computer-implemented method as recited in claim 8, further comprising, prior to displaying the selection list, filtering the target object choices dependent upon one or more of the selected source object, the selected event, and the selected action.

10. The computer-implemented method as recited in claim 1, further comprising displaying a selection list comprising plurality of different action choices for the action selection element, wherein said receiving input via the action selection element comprises receiving a selection indication of one of the plurality of different action choices.

11. The computer-implemented method as recited in claim 10, further comprising, prior to displaying the selection list, filtering the action choices dependent upon one or more of the selected source object, the selected event, and the selected target object.

12. The computer-implemented method as recited in claim 1, further comprising displaying a timeline interface usable to specify an elapsed time to wait before the selected action associated with the selected target object is performed.

13. The computer-implemented method as recited in claim 1, further comprising displaying within the object interaction construction interface a second set of the plurality of user interface elements usable to define one or more interactions between the selected source object and one or more target objects according to the defined syntax, wherein the second set comprises a second event selection element, a second target object selection element, and a second action selection element.

14. A computer system, comprising:
one or more processors; and
a memory coupled to the one or more processors, wherein the memory stores program instructions executable by the one or more processors to implement an object interaction construction interface configured to:
display a plurality of user interface elements usable to define one or more interactions between a selected source object and one or more target objects according to a defined syntax,
wherein the plurality of user interface elements comprise an event selection element, a target object selection element, and an action selection element,
wherein the event selection element is displayed including a visual indicator that an event selection needs to be made,
wherein the target object selection element is displayed including a visual indicator that a target object selection needs to be made,
wherein the action selection element is displayed including a visual indicator that an action selection needs to be made, and
wherein each of the plurality of user interface elements is displayed together within the object interaction construction interface in a pre-defined order determined by the defined syntax;
receive input via the event selection element specifying a selected event;
in response to receiving input specifying the selected event, replace the display of the visual indicator that the event selection needs to be made with a display of a visual indicator of the selected event;
receive input via the target object selection element specifying a selected target object;
in response to receiving input specifying the selected target object, replace the display of the visual indicator that the target object selection needs to be made with a display of a visual indicator of the selected target object;
receive input via the action selection element specifying a selected action;
in response to receiving input specifying the selected action, replace the display of the visual indicator that the action selection needs to be made with a display of a visual indicator of the selected action;
wherein each visual indication of the one or more interactions defined via the object interaction construction interface is displayed according to the defined syntax and indicates that, in response to the selected event associated with the selected source object, the selected action will be performed relative to the selected target object, and
wherein the visual indication of the selected event, the selected target object, and the selected action are displayed together within the object interaction construction interface in the pre-defined order determined by the defined syntax.

15. The computer system as recited in claim 14, wherein the object interaction construction interface is part of a software development application, wherein the program instructions are further executable to generate program instructions executable to implement the one or more interactions defined via the object interaction construction interface.

16. The computer system as recited in claim 14, wherein the object interaction construction interface is part of a software development application, wherein the object interaction construction interface is displayed as a defined subregion within a user interface for the software development application, wherein other portions of the user interface for the software development application remain active while a user is interacting with the object interaction construction interface.

17. The computer system as recited in claim 16, wherein the program instructions are further executable to provide a user-configurable transparency level for the defined subregion for the object interaction construction interface, wherein an underlying portion of the user interface for the software development application is visible through the defined subregion dependent upon the transparency level.

18. The computer system as recited in claim 14, further comprising:
repeating said displaying an object interaction construction interface, wherein for each repeated displaying, the plurality of user interface elements is displayed together within the object interaction construction interface according to the pre-defined order.

19. The computer system as recited in claim 14, wherein the object interaction construction interface is further configured to:
display a selection list comprising a plurality of different event choices for the event selection element, wherein said receiving input via the event selection element comprises receiving a selection indication of one of the plurality of different event choices; and
in response to receiving the input specifying the selected event, display in the object construction interface a visual indication of the selected event, wherein said display of the visual indication of the selected event replaces a display of the selection list.

20. The computer system as recited in claim 19, wherein the object interaction construction interface is further configured to, prior to displaying the selection list, filter the event choices dependent upon one or more of the selected source object, the selected target object, and the selected action.

21. The computer system as recited in claim 14, wherein the object interaction construction interface is further configured to display a selection list comprising a plurality of different target object choices for the target object selection element, wherein said receiving input via the target object selection element comprises receiving a selection indication of one of the plurality of different target object choices.

22. The computer system as recited in claim 21, wherein the object interaction construction interface is further configured to, prior to displaying the selection list, filter the target object choices dependent upon one or more of the selected source object, the selected event, and the selected action.

23. The computer system as recited in claim 14, wherein the object interaction construction interface is further configured to display a selection list comprising plurality of different action choices for the action selection element, wherein said receiving input via the action selection element comprises receiving a selection indication of one of the plurality of different action choices.

24. The computer system as recited in claim 23, wherein the object interaction construction interface is further configured to, prior to displaying the selection list, filter the action choices dependent upon one or more of the selected source object, the selected event, and the selected target object.

25. The computer system as recited in claim 14, wherein the object interaction construction interface is further configured to display a timeline interface usable to specify an elapsed time to wait before the selected action associated with the selected target object is performed.

26. The computer system as recited in claim 14, wherein the object interaction construction interface is further configured to display within the object interaction construction interface a second set of the plurality of user interface elements usable to define one or more interactions between the selected source object and one or more target objects according to the defined syntax, wherein the second set comprises a second event selection element, a second target object selection element, and a second action selection element.

27. A non-transitory computer-accessible storage medium storing program instructions computer-executable to implement an object interaction construction interface configured to:
- display a plurality of user interface elements usable to define one or more interactions between a selected source object and one or more target objects according to a defined syntax,
  - wherein the plurality of user interface elements comprise an event selection element, a target object selection element, and an action selection element,
  - wherein the event selection element is displayed including a visual indicator that an event selection needs to be made,
  - wherein the target object selection element is displayed including a visual indicator that a target object selection needs to be made,
  - wherein the action selection element is displayed including a visual indicator that an action selection needs to be made, and
  - wherein each of the plurality of user interface elements is displayed together within the object interaction construction interface in a pre-defined order determined by the defined syntax;
- receive input via the event selection element specifying a selected event;
- in response to receiving input specifying the selected event, replace the display of the visual indicator that the event selection needs to be made with a display of a visual indicator of the selected event;
- receive input via the target object selection element specifying a selected target object;
- in response to receiving input specifying the selected target object, replace the display of the visual indicator that the target object selection needs to be made with a display of a visual indicator of the selected target object;
- receive input via the action selection element specifying a selected action;
- in response to receiving input specifying the selected action, replace the display of the visual indicator that the target object selection needs to be made with a display of a visual indicator of the selected target object;
- wherein each visual indication of the one or more interactions defined via the object interaction construction interface is displayed according to the defined syntax and indicates that, in response to the selected event associated with the selected source object, the selected action will be performed relative to the selected target object, and
- wherein the visual indication of the selected event, the selected target object, and the selected action are displayed together within the object interaction construction interface in the pre-defined order determined by the defined syntax.

28. The non-transitory computer-accessible storage medium as recited in claim 27, wherein the object interaction construction interface is part of a software development application, wherein the program instructions are further executable to generate program instructions executable to implement the one or more interactions defined via the object interaction construction interface.

29. The non-transitory computer-accessible storage medium as recited in claim 27, wherein the object interaction construction interface is part of a software development application, wherein the object interaction construction interface is displayed as a defined subregion within a user interface for the software development application, wherein other portions of the user interface for the software development application remain active while a user is interacting with the object interaction construction interface.

30. The non-transitory computer-accessible storage medium as recited in claim 29, wherein the program instructions are further executable to provide a user-configurable transparency level for the defined subregion for the object interaction construction interface, wherein an underlying portion of the user interface for the software development application is visible through the defined subregion dependent upon the transparency level.

31. The non-transitory computer-accessible storage medium as recited in claim 27, further comprising:
- repeating said displaying an object interaction construction interface, wherein for each repeated displaying, the plurality of user interface elements is displayed together within the object interaction construction interface according to the pre-defined order.

32. The non-transitory computer-accessible storage medium as recited in claim 27, wherein the object interaction construction interface is further configured to:
- display a selection list comprising a plurality of different event choices for the event selection element, wherein said receiving input via the event selection element comprises receiving a selection indication of one of the plurality of different event choices; and
- in response to receiving the input specifying the selected event, displaying in the object construction interface a visual indication of the selected event, wherein said displaying of the visual indication of the selected event replaces a display of the selection list.

33. The non-transitory computer-accessible storage medium as recited in claim 32, wherein the object interaction construction interface is further configured to, prior to displaying the selection list, filter the event choices dependent upon one or more of the selected source object, the selected target object, and the selected action.

34. The non-transitory computer-accessible storage medium as recited in claim 27, wherein the object interaction construction interface is further configured to display a selection list comprising a plurality of different target object choices for the target object selection element, wherein said receiving input via the target object selection element comprises receiving a selection indication of one of the plurality of different target object choices.

35. The non-transitory computer-accessible storage medium as recited in claim 34, wherein the object interaction construction interface is further configured to, prior to displaying the selection list, filter the target object choices dependent upon one or more of the selected source object, the selected event, and the selected action.

36. The non-transitory computer-accessible storage medium as recited in claim 27, wherein the object interaction construction interface is further configured to display a selection list comprising plurality of different action choices for the action selection element, wherein said receiving input via the action selection element comprises receiving a selection indication of one of the plurality of different action choices.

37. The non-transitory computer-accessible storage medium as recited in claim 36, wherein the object interaction construction interface is further configured to, prior to displaying the selection list, filter the action choices dependent upon one or more of the selected source object, the selected event, and the selected target object.

38. The non-transitory computer-accessible storage medium as recited in claim 27, wherein the object interaction construction interface is further configured to display a timeline interface usable to specify an elapsed time to wait before the selected action associated with the selected target object is performed.

39. The non-transitory computer-accessible storage medium as recited in claim 27, wherein the object interaction construction interface is further configured to display within the object interaction construction interface a second set of the plurality of user interface elements usable to define one or more interactions between the selected source object and one or more target objects according to the defined syntax, wherein the second set comprises a second event selection element, a second target object selection element, and a second action selection element.

* * * * *

UNITED STATES PATENT AND TRADEMARK OFFICE
CERTIFICATE OF CORRECTION

PATENT NO. : 8,386,960 B1
APPLICATION NO. : 12/201339
DATED : February 26, 2013
INVENTOR(S) : Eismann et al.

It is certified that error appears in the above-identified patent and that said Letters Patent is hereby corrected as shown below:

On the Title Page, Item [57], Line 1, between "...may have" and "object", delete "a" and insert -- an --, therefor.

Signed and Sealed this
Twenty-second Day of October, 2013

Teresa Stanek Rea
*Deputy Director of the United States Patent and Trademark Office*